(12) United States Patent
Ekstrom (10) Patent No.: US 9,551,448 B2
(45) Date of Patent: Jan. 24, 2017

(54) COUPLING DESIGNED FOR PRESSURE-RELIEVED COUPLING

(71) Applicant: CEJN AB, Skovde (SE)

(72) Inventor: Jorgen Ekstrom, Skovde (SE)

(73) Assignee: CEJN AB (SE)

( * ) Notice: Subject to any disclaimer, the term of this patent is extended or adjusted under 35 U.S.C. 154(b) by 25 days.

(21) Appl. No.: 14/384,850

(22) PCT Filed: Apr. 16, 2013

(86) PCT No.: PCT/SE2013/050412
§ 371 (c)(1),
(2) Date: Sep. 12, 2014

(87) PCT Pub. No.: WO2013/158022
PCT Pub. Date: Oct. 24, 2013

(65) Prior Publication Data
US 2015/0041010 A1    Feb. 12, 2015

(30) Foreign Application Priority Data

Apr. 18, 2012 (SE) .................................. 1250389-2

(51) Int. Cl.
*F16L 37/30* (2006.01)
*F16L 37/38* (2006.01)
(Continued)

(52) U.S. Cl.
CPC ................. *F16L 37/30* (2013.01); *F16K 1/12* (2013.01); *F16K 31/445* (2013.01); *F16L 37/34* (2013.01);
(Continued)

(58) Field of Classification Search
CPC ............ F16L 29/00; F16L 29/02; F16L 29/04; F16L 37/00; F16L 37/28; F16L 37/30; F16L 37/32; F16L 37/34; F16L 37/38; F16L 37/40; F16L 37/413
(Continued)

(56) References Cited

U.S. PATENT DOCUMENTS 3,155,370 A * 11/1964 Drumm et al. ......... F16K 1/126
137/614.06
3,358,708 A * 12/1967 Williams ............... F16L 37/113
137/495
(Continued)

FOREIGN PATENT DOCUMENTS

| CH | 315412 | 8/1956 |
| FR | 1012834 | 7/1952 |
| WO | 9834459 | 8/1998 |

OTHER PUBLICATIONS

International Search Report and Written Opinion, PCT/SE2013/050412, Mailed May 7, 2013.
(Continued)

*Primary Examiner* — Kevin Lee
(74) *Attorney, Agent, or Firm* — Workman Nydegger (57) ABSTRACT

This invention relates to a coupling comprising a male part and a female part (7, 9), each having a ducting system (39) for the transmission of fluid (F) during the use of the coupling (1, 1', 2), at least a front portion (13) comprising a main valve member (19) designed to prevent the fluid (F) from leaving the ducting system (39) when the coupling (1, 1', 2) is uncoupled. An operating member (5) is connected to a pilot valve member (41, 63, 63", 64) for controlling the flow of fluid (F) to and for pressurizing a valve chamber (45, 45") in which a pressure relief valve member (33, 33', 35, 35") is designed to move into a position in which the ducting system (39) is opened or throttled.

17 Claims, 7 Drawing Sheets

(51) Int. Cl.
*F16L 37/413* (2006.01)
*F16L 37/34* (2006.01)
*F16K 1/12* (2006.01)
*F16K 31/44* (2006.01)

(52) U.S. Cl.
CPC .............. *F16L 37/38* (2013.01); *F16L 37/413* (2013.01); *Y10T 137/87973* (2015.04)

(58) Field of Classification Search
USPC ................................ 137/614, 614.03–614.06
See application file for complete search history.

(56) References Cited

U.S. PATENT DOCUMENTS

| | | | |
|---|---|---|---|
| 3,729,023 A | | 4/1973 | Hammond |
| 4,240,466 A | * | 12/1980 | Herzan et al. ....... B62D 49/065 137/614.04 |
| 6,095,190 A | * | 8/2000 | Wilcox et al. .......... F16L 37/23 137/614 |
| 8,113,240 B2 | * | 2/2012 | Blanchard et al. ..... F17C 13/04 137/614.06 |

OTHER PUBLICATIONS

International Preliminary Report on Patentability, PCT/SE2013/050412, Mailed Oct. 30, 2014.

* cited by examiner

COUPLING DESIGNED FOR PRESSURE-RELIEVED COUPLING

CROSS-REFERENCE TO RELATED APPLICATIONS

This application claims priority to and the benefit of PCT Application No. PCT/SE2013/050412, filed Apr. 16, 2013, entitled "COUPLING DESIGNED FOR PRESSURE-RELIEVED COUPLING", which claims the benefit of and priority to Sweden Patent Application No. 1250389-2, filed Apr. 18, 2012, each of which is incorporated herein in its entirety.

TECHNICAL FIELD

This invention relates to a coupling according to the pre-characterising part of claim 1. The field of application of the invention is the industry for the manufacture of couplings of various kinds.

BACKGROUND

In the case of present-day couplings, such as quick-acting couplings, coaxial couplings, etc., it can sometimes be difficult for a user to couple the male and female parts of the coupling together when one of the parts is pressurised. The fluid may be air, gases, water, oils, greases, etc. When a coupling part is pressurised, the valve body, or main valve member, mounted in the coupling part has to be pushed in with great force in order to open a flow passage in the coupling part. Relief valves of various types are available, but these are often complicated and bulky and are sometimes not adequate for relieving high pressure. There is also a desire for couplings used often by workshop employees to be made user-friendly. There is also a need to provide couplings that can be used by persons having limited strength when one of the parts is pressurised. It is also desirable to provide a coupling that, purely from a safety point of view, will be coupled when one of the coupling parts is under high pressure. The coupling does not have to be limited to safety equipment, but can be applied to workshops, elderly care, hospitals, etc., where couplings are required in order to couple pressurised systems together.

U.S. Pat. No. 6,095,190 describes a coupling that attempts to solve the problem by easier coupling together of a pressurised female part and a male part. The solution is to provide three valves, namely a slide valve, a relief valve and a main valve, the valves opening in the aforementioned order upon coupling. A flexible ball valve is actuated by an actuator during the coupling operation and the excess pressure can be reduced.

U.S. Pat. No. 6,095,190 has an operating member in the form of a sleeve acting as a locking sleeve rotated into engagement with a stop in order to prevent unintended opening.

SUMMARY OF THE INVENTION

There remains a need to provide the coupling described hereinabove specified in the pre-characterising part of claim 1 in a simple and cost-effective manner. The coupling should also be user-friendly, reliable and suitable for use in life-saving equipment.

The aim of the invention is therefore to provide a coupling in which coupling can be effected without any great muscle power on the part of the user, while at the same time the coupling can be made less bulky with as few parts as possible.

Another aim is to provide a coupling that functions in an ergonomically satisfactory manner during the coupling operation.

Another aim is to allow the male part of the coupling to be under high pressure during the coupling operation.

Another aim is to provide a coupling that can be used in a reliable manner in life-saving equipment and that can simply be coupled in without rescue workers having to shut off the pressure source.

DESCRIPTION OF THE INVENTION

The abovementioned problems are solved by means of the coupling defined in the introductory part according to the characterising part of claim 1.

This results in a coupling that can be coupled in a simple manner even if high pressure prevails in one of the parts (male part or female part). Coupling can also be made easier in the case of low pressure and a user having limited strength in his fingers or hand. Operation of the pilot valve member shuts off the flow of fluid into the coupling part upstream of the pressure relief valve member and at a distance from the main valve member. The main valve member can thus open without any pressure being applied thereto, in spite of the fact that the coupling part (male part or female part) is pressurised.

Coupling can thus be effected without any great muscle power on the part of the user, while at the same time the coupling can be made less bulky with as few components as possible. It is thus possible to provide a coupling that functions in a satisfactory manner from an ergonomic point of view during the coupling operation. Rescue workers can therefore also couple the coupling in a reliable manner.

The operating member is preferably a sliding sleeve situated on the outside of the male part or female part.

A user can thus push the sliding sleeve in the coupling direction automatically when he couples the coupling when one of the coupling parts is pressurised. The user can then hold the sleeve in one hand and the other coupling part (male part or female part) in the other hand. When he brings the two coupling parts together, as the pressure relief sleeve can advantageously slide away from the pressure source, the coupling part (e.g. the female part) comprising the sleeve is automatically simultaneously oriented relative to and moved towards the corresponding coupling part (in this case the male part), thereby further facilitating coupling. In rescue operations, the coupling operation is the critical moment.

The valve chamber is advantageously delimited by a wall surface of the pressure relief valve member, said wall surface acting as a pressure surface for driving the pressure relief valve member.

The area of the said wall surface (pressure surface) is preferably greater than the surface of the pressure relief valve member directed towards the flow direction of the fluid, i.e. in the direction of the pressure source of the fluid.

The pressure relief valve member preferably comprises a through duct having a smaller diameter than the main diameter of the rest of the ducting system.

This results in a nozzle that creates a negative pressure in the valve chamber (when the pilot valve member is opened) in order to open the pressure relief valve member. The said through duct produces a connection between the ducting system with pressurised fluid upstream of the pressure relief valve member and the valve chamber itself behind the pressure relief valve member. In its closed/throttled position, the valve chamber has the same pressure as that prevailing in the pressurised ducting system upstream of the pressure relief valve member. As the pressure surface of the pressure relief valve member directed towards the valve chamber has a larger area than the opposing surface of the pressure relief valve member (directed towards the pressure produced by the pressure source), the valve body of the pressure relief valve member is pressurised in the direction of the pressurised flow of the pressure source. The valve body is thus pressed against a valve seat designed to come to rest adjacent to the opposing surface when the pressure is relieved. The valve seat is advantageously formed by a portion of the ducting system and is designed to bear in a sealing manner against the valve body of the pressure relief valve member in its closed position. The valve body of the pressure relief valve member therefore has a sealing effect on the main duct of the ducting system, said duct beginning at the connection of the coupling part designed for connection to the pressure source (often via a tube) and ending at the said valve seat. A resilient mechanism driving the valve body towards the valve seat is advantageously provided to initiate movement of the valve body out of the open position and to drive the valve body initially towards the valve seat, and the said pressure surfaces mutually ensure that the valve body seals against the valve seat.

A resilient mechanism is advantageously provided for the pressure relief valve member in order to initiate movement of the latter from the open position to the throttling or closing position.

The resilient mechanism may advantageously be adapted in such a manner that the force exerted upon the valve body of the pressure relief valve member by the mechanism is so great that the valve body of the valve member is held in the closed position against the valve seat. It may be advantageous if the areas of the two pressure surfaces are similar and the pressure on the two pressure surfaces of the valve body is thus the same. When the pilot valve then opens, a negative pressure that is greater than the force of the resilient mechanism is created in the valve chamber as a result of the nozzle effect and the valve body of the pressure relief valve member opens. This nozzle effect may also be greater than the said force in the case of other embodiments.

The resilient mechanism is preferably a helical spring (compression spring), a rubber pad, an elastic spring system, internally pressurised air acting in a resilient manner in the valve chamber behind the valve body and/or designed for electromagnetic actuation of the valve body.

The pressure relief valve member is advantageously cylindrical.

This results in a pressure relief valve member with a cylindrical valve body that can move in the longitudinal direction of the coupling parallel to the centre line of the coupling. In a case of this kind, the valve chamber is also cylindrical and also extends in the direction of the centre line. The diameter of the coupling can thus be smaller. The valve body is thus designed in such a manner that it can slide to and fro in the valve chamber.

The pressure relief valve member preferably has a passageway with a smaller diameter than a passageway of the pilot valve member.

This therefore guarantees a negative pressure in the valve chamber when the pilot valve is opened and the passageway (through duct) in the pressure relief valve member acts as a nozzle creating a negative pressure in the valve chamber.

The main valve member advantageously comprises a bleeder valve (relief valve) designed to bleed off excess pressure remaining in the ducting system between the main valve member and the pressure relief valve member.

This results in further pressure relief for a pressurised coupling part comprising the ducting system extending between the closed pressure relief valve member and the closed main valve member. Pressurised fluid contained in the ducting system between its valve members can thus be bled out of the ducting system even if the coupling part is pressurised. This further facilitates coupling.

The main valve member preferably comprises a slide valve.

The said relief valve and pilot valve can thus be added in a simple manner to conventional quick-acting couplings and manufacture can take place using existing components for main valve members, thereby resulting in cost-effective manufacture.

The fluid advantageously comprises gas, water, oil and/or air.

It is thus possible to provide a coupling that can be adapted for the desired purpose. In workshops, compressed air is often used for various work operations and equipment is frequently coupled to pressure sources. Using great force during coupling in order to overcome the force applied by the main valve member (valve body) of the pressurised coupling part may become arduous over time and this coupling ensures that the work is carried out in an ergonomically correct manner as the coupling operation is easier. This may mean fewer wear and tear injuries for workshop employees. Persons only able to apply a small amount of force with their hands and arms will also benefit from this idea as they can relieve the pressure on the main valve member by means of, e.g. a large push button (operating member). This may be desirable when coupling, e.g. a pressurised water hose.

The operating member preferably comprises a push button.

A user can thus use the palm of his hand and press the button while simultaneously moving the coupling parts together.

The ducting system advantageously comprises a plurality of parallel ducts arranged circumferentially at a distance from and parallel to the valve chamber of the pressure relief valve member.

Thus, when the pressure relief valve member and the pilot valve member are opened, the fluid will pass through several ducts of the ducting system, thereby allowing for significant flow through the coupling when it is coupled. The surrounding ducts are preferably arranged symmetrically circumferentially around the valve chamber and extend essentially along the centre line.

The coupling is preferably a single coupling.

The coupling is advantageously a coaxial coupling for life-saving equipment.

Rescue workers therefore do not have to shut off the pressure source, thereby saving time. The coupling can thus be used in a reliable manner with life-saving equipment.

SUMMARY OF THE FIGURES

The invention will now be described with reference to the accompanying diagrammatic drawings, in which.

DETAILED DESCRIPTION OF EMBODIMENTS

The invention will now be described by way of several embodiments. Components of the same type in different figures of the diagrammatic drawings may be designated by the same reference numerals. There may also be figures with components that are not provided with reference numerals, but that correspond to components provided with reference numerals in other figures. Components that are not relevant to the invention may be omitted from some figures for the sake of clarity.

FIG. 1 shows a coupling 1 according to one embodiment in which a push button 3 is provided as an operating member 5. The coupling 1 comprises a male part 7 and a female part 9. The male part 7 is coupled to a pressure source 11 for compressed air. The male part 7 comprises a front portion 13 and a rear portion 15. The rear portion 15 includes a connection piece 17 for connection to the pressure source 11. A main valve member 19 comprises a primary valve body 21 in the form of a slide valve 23 having inclined sealing surfaces 25 and a primary valve seat 27 against which the primary valve body 21 bears as a result of the pressurised air supplied by the pressure source 11. An electromagnet 29 acts as a resilient mechanism 31 and is activated by a user (not shown) during coupling of the coupling 1 so that a pressure relief valve member 33 (comprising another valve body 35 and another valve seat 37) is set in motion (the valve body 35 moves) in the longitudinal direction parallel to the centre line CL of the coupling 1. FIG. 1a shows that the male part 7 is under the pressure P1. The ducting system 39 of the male part 7 is thus under the pressure P1 upstream of the other valve seat 37 and downstream thereof. In order to facilitate coupling of the male part 7 and the female part 9, the user presses the push button 3 according to FIG. 1b, a valve stem 41 in engagement with the push button 3 being pressed downwards. The valve stem 41 seals off a passageway 43 in such a manner that a hole 53 provided in the valve stem 41 and having a flow diameter of approximately 4 mm comes to rest in front of the passageway 43. The passageway 43 is otherwise in communication with a valve chamber 45 in which the other valve body 35 is mounted to slide parallel to the direction of the centre line CL.

Figure 1A:
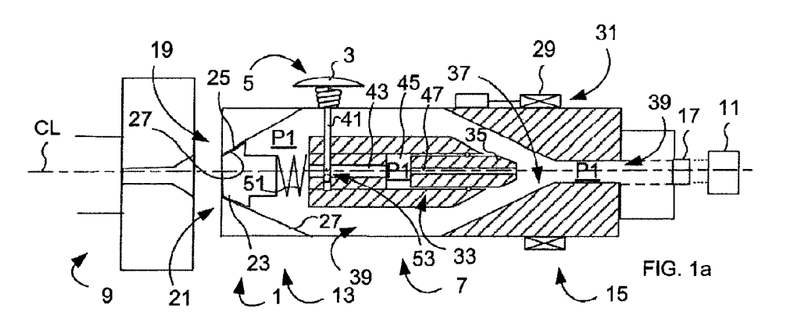
FIGS. 1a-1d show a first embodiment of the invention having an ergonomic push button for easier coupling of the coupling.
Figure 1B:
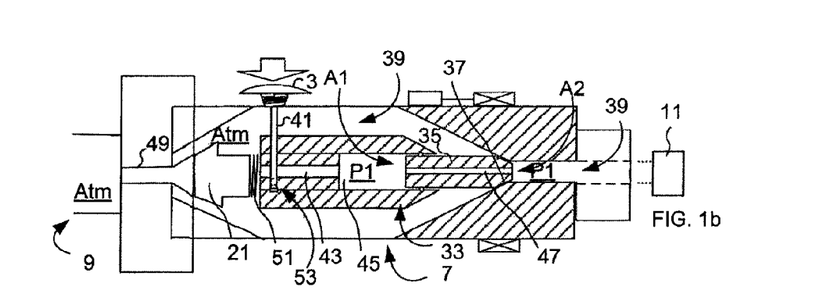
Figure 1C:
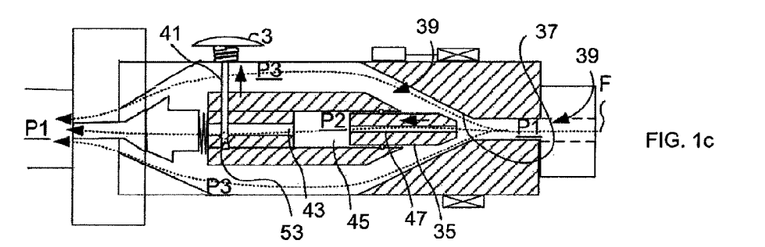
Figure 1D:
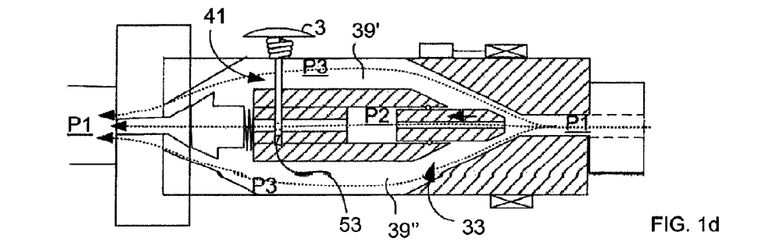

A through bore 47 (hole with a diameter of approximately 3 mm) in the other valve body 35 ensures that the pressure P1 is also produced in the valve chamber 45 when the hole 53 is moved away from the passageway 43 and the valve stem provides sealing. The resilient action of the electromagnet 29 on the valve body 35 initiates movement of the other valve body 35. When the area A1 of the other valve body 35 directed towards the valve chamber 45 is greater than the opposing pressure area A2 directed towards the pressure source 11, the other valve body 35 is pushed with force against the other valve seat 37 and seals off the ducting system 39 of the male part 7 upstream of the pressure relief valve member 33. The female part 9 is coupled to the male part 7 and an actuator 49 of the male part 9 simultaneously pushes in the primary valve body 21 in the male part 7. By virtue of the fact that the pressure is shut off at the other valve body 35 in the rear portion of the male part, the user can couple the coupling parts 7 and 9 together using only a little force by pressing the push button 3. When the primary valve body 21 is pushed in by a small amount, atmospheric pressure prevails in the ducting system 39 downstream of the other valve body 35 and only the spring force from a primary spring 51 supporting the primary valve body 21 has to be overcome. FIG. 1c shows how the user releases the push button 3 and the hole 53 provided in the valve stem 41 returns to its position in the passageway 43, as a result of which the compressed air F can pass through the through bore 47 in the other valve body 35 and the now open passageway 43 via the hole 53 in the valve stem 41. The smaller flow area of the through bore 47 relative to the flow area of the hole 53 in the valve stem 41 means that a negative pressure is created in the valve chamber 45, said negative pressure (the pressure at P1 is greater than the pressure P2 behind the other valve body) drives the other valve body 35 towards a position in the valve chamber 45 in which the ducting system 39 is opened and compressed air can flow freely past the other valve seat 37 and the other valve body 35. Compressed air now flows fully through four (only two are shown) ducts 39', 39" surrounding the valve chamber 45 when the push button 3 is fully released, as shown in FIG. 1d. When the pressure relief valve member 33 and the pilot valve member (valve stem 41) are then open, the compressed air can pass through several ducts 39', 39" . . . 39'" of the ducting system 39, thereby allowing for significant flow through the coupling 1 when it is coupled. In this example, the surrounding ducts 39', 39" . . . 39'" are arranged symmetrically circumferentially around the valve chamber 45 and extend along the centre line CL.

Figure 2A:
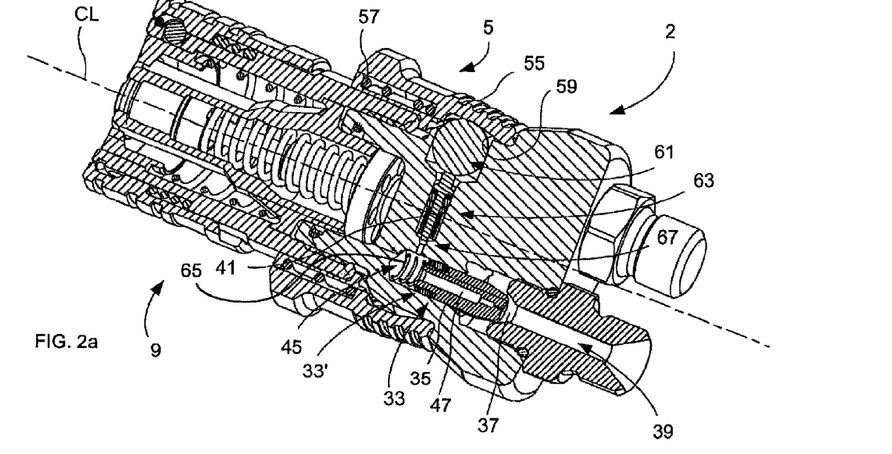
FIGS. 2a-2c show another embodiment in the case of a coaxial coupling having a sliding outer sleeve designed for simpler and more reliable coupling of the coupling.
Figure 2B:
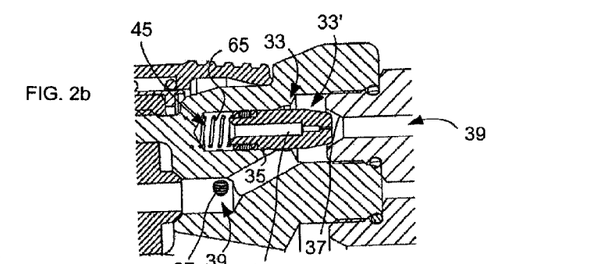
Figure 2C:
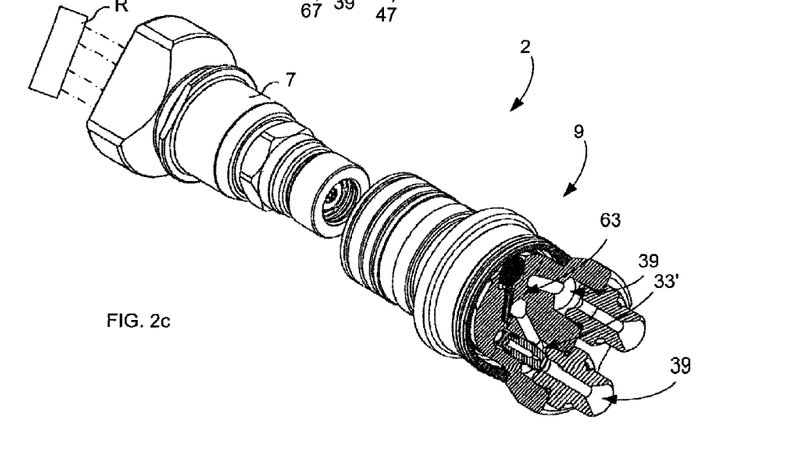

FIGS. 2a-2c show another embodiment representing and suitable for a coaxial coupling 2 (FIG. 2a shows the female part 9) shown in cross section and having a sliding outer sleeve 55 situated on the outside acting as an operating member 5. FIG. 2a shows the female part 9 of the coupling 2 provided with the open pressure relief valve member 33. The sleeve 55 is shown in its rear sprung-back final position. Spring-back is effected by means of a spring 57. An inclined inner surface 59 of the sleeve 55 is in contact with a ball 61. The ball 61 is in turn in contact with a pilot valve 63 (valve stem 41 which is sprung back by means of valve stem springs bears against the ball 61 and holds the latter in contact with the inner surface 59). The sprung-back valve stem 41 is designed to open the valve chamber 45 in fluid communication with the rest of the ducting system 39 of the female part 9. When the female part 9 is pressurised, the entire ducting system 39 is pressurised on the pressure side (a return side is not yet pressurised). FIG. 2b is an enlarged cross section of the relief valve 33' comprising a resilient helical spring 65, a valve body 35 including a through hole 47, and a valve seat 37. The through hole 47 is stepped, as a result of which a nozzle effect can be produced and guarantees negative pressure in the valve chamber 45 when fluid flows through the valve chamber 45. The through duct 47 of the pressure relief valve member 33 (relief valve 33') in this case always at least partly has a smaller diameter than the main diameter of the rest of the ducting system 39 for flow-through. FIG. 2c is a perspective view of the entire coupling 2 with a portion of the female part 9 cut away when the pilot valve 63 and the relief valve 33' are open and the entire ducting system 39 of the female part 9 is thus pressurised. A valve stem hole 67 is in the open position when the valve stem is sprung back. The valve stem hole 67 has a larger diameter than the hole 47. Life-saving equipment R operating with the aid of pressurised fluid and sending back return fluid is connected to the male part 7 of the coaxial coupling 2.

Figure 3A:
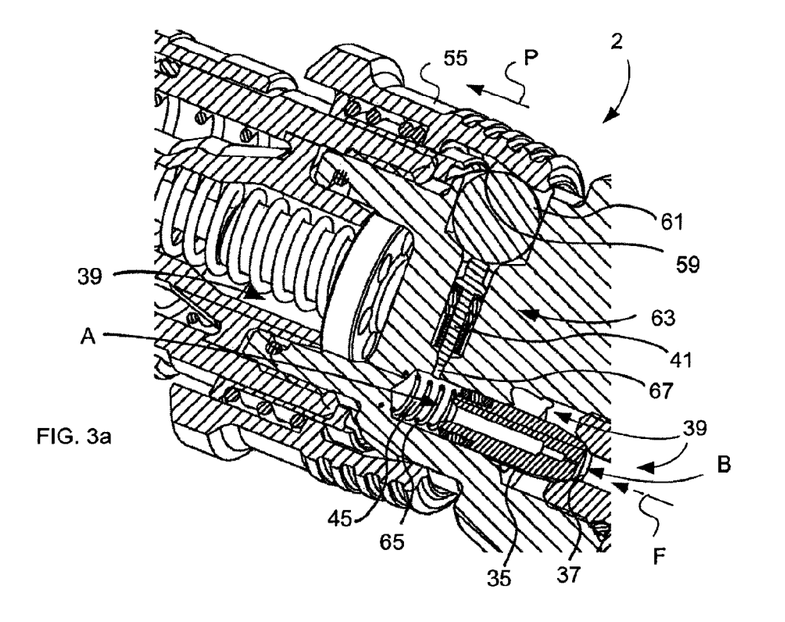
FIGS. 3a and 3b show enlarged portions of the coaxial coupling shown in cross section in FIG. 2a in the closed position.
Figure 3B:
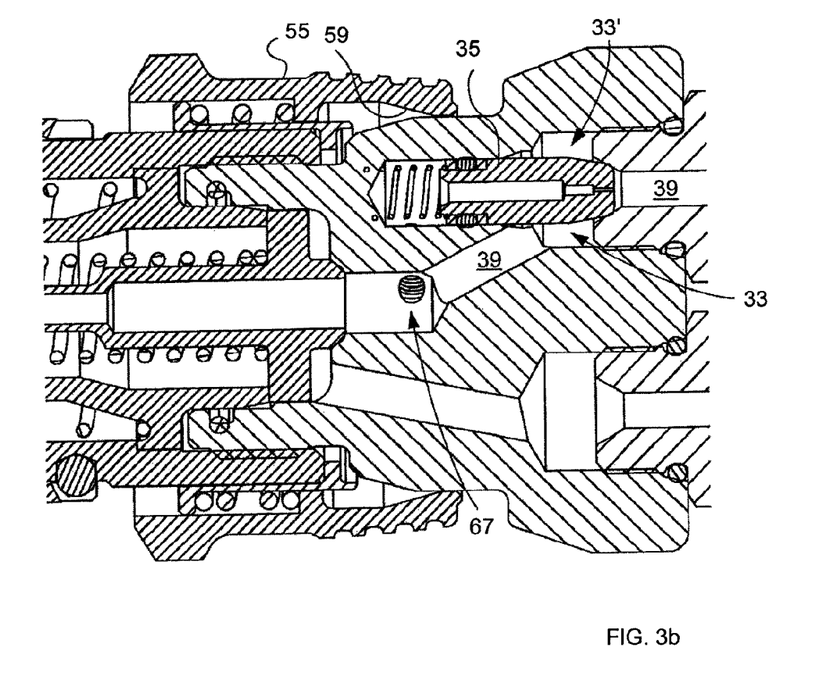

FIGS. 3a and 3b show enlarged portions of the coaxial coupling 2 shown in cross section in FIG. 2a, but now in the closed position. The sleeve 55 is gripped by the user and moved forwards in the direction of the arrow P (the same direction in which the fluid F flows in the coupling 2 from the pressure source (not shown), as the coupling 2 is used after coupling). The inclined inner surface 59 then presses down the ball 61, which in turn actuates the valve stem 41 in order to seal off the through hole 67 of the pilot valve 63 which connects the valve chamber 45 to the ducting system 39 (see also FIG. 2b). By virtue of the now higher pressure in the valve chamber 45 (produced by means of the closure of the hole 67 and the through hole 47 which has a relatively small diameter compared to the rest of the ducting system 39), the helical spring 65 can drive the valve body 35 in the direction of the valve seat 37. The throttling and closure of the valve body 35 against the valve seat 37 is effected in that the valve chamber 45 is delimited by a wall surface of the valve body 35, said wall surface acting as a pressure surface A for driving the valve body 35 towards the valve seat 37 and for holding the valve body 35 against the valve seat 37 in a sealing manner. This pressure surface A has an area that is larger than the surface B of the valve body 35 directed towards the flow direction of the fluid, i.e. in the direction of the pressure source of the fluid F. As the pressure in the valve chamber 45 and the ducting system 39 upstream of the valve body 35 gradually becomes the same, the larger area of the pressure surface A directed towards the valve chamber 45 generates a greater pressure force on the said pressure surface A and the valve body 35 is held in position against the valve seat 37. FIG. 3b shows an enlarged portion of the relief valve 33' of the pressure relief valve member 33 comprising the valve body 35.

Figures 4A, 4B:
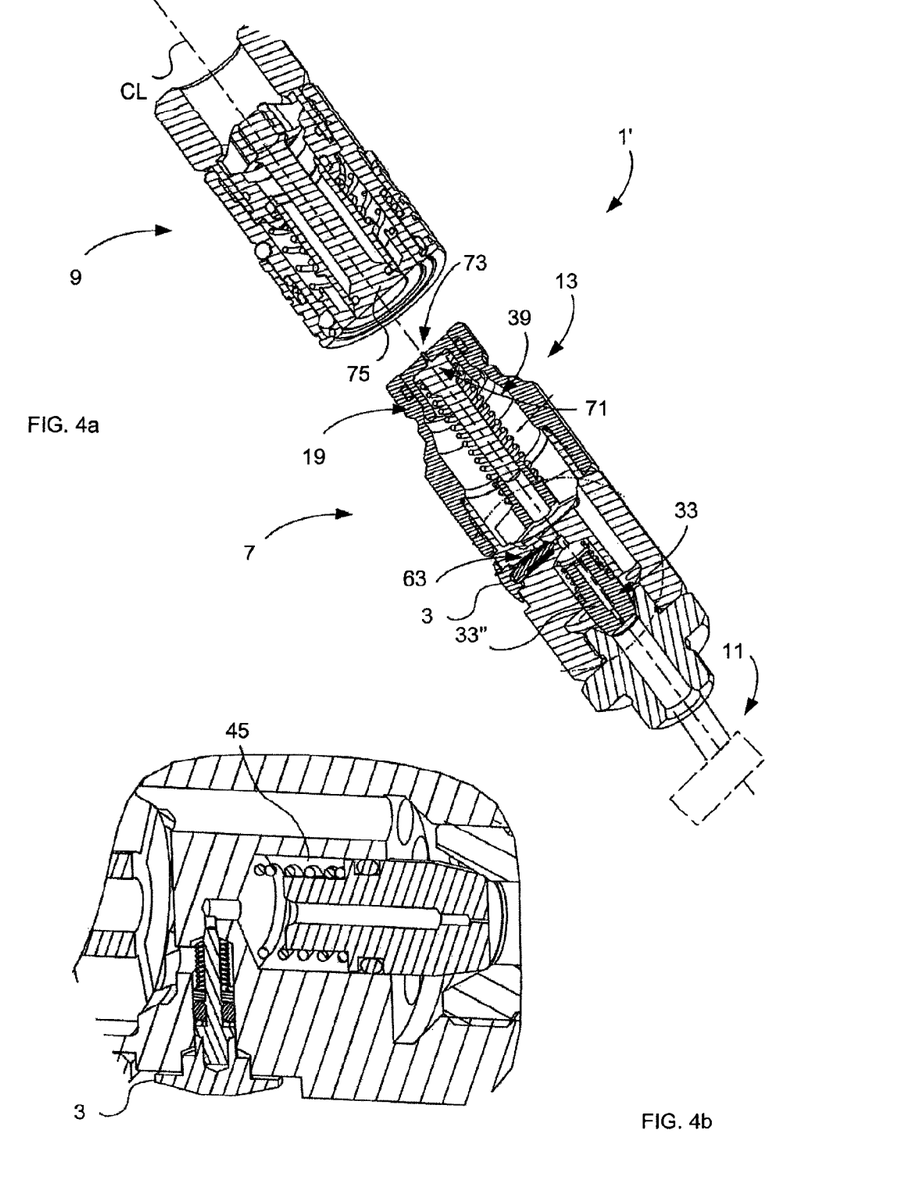
FIGS. 4a and 4b show a single coupling according to a third embodiment in which the male part has a pilot valve and with a bleeder valve provided in the main valve of the male part.

FIGS. 4a and 4b show a single coupling 1' according to a third embodiment. The male part 7 in this case has a pilot valve 63 and a relief valve body 33". A main relief valve 71 (also referred to as a bleeder valve) is provided in a main valve 19 in the front portion 13 of the male part 7. This main relief valve 71 comprises a projection 73 designed to come into engagement with the actuator 75 of the female part 9 during coupling. The projection 73 presses the main relief valve 71 in the direction of the pressure source 11 and any pressurised oil contained between the main valve 19 and the relief valve body 33" can flow out, thereby further facilitating coupling. The main valve 19 therefore comprises a bleeder valve designed to bleed off excess pressure in the ducting system 39 between the main valve 19 and the pressure relief valve member 33. The push button 3 has already been pressed by the user in order to close the oil pressure-actuated main valve 19 in a similar manner to that described hereinabove. FIG. 4b shows this pressing of the push button 3 in diagrammatic form, wherein a higher pressure builds up in the inner space of the valve chamber 45 and drives the relief valve body 33" of the pressure relief valve member 33 in the direction of the pressure source 11 or against the pressure direction of the oil and it is then held closed as long as the push button 3 is pressed.

Figure 5:
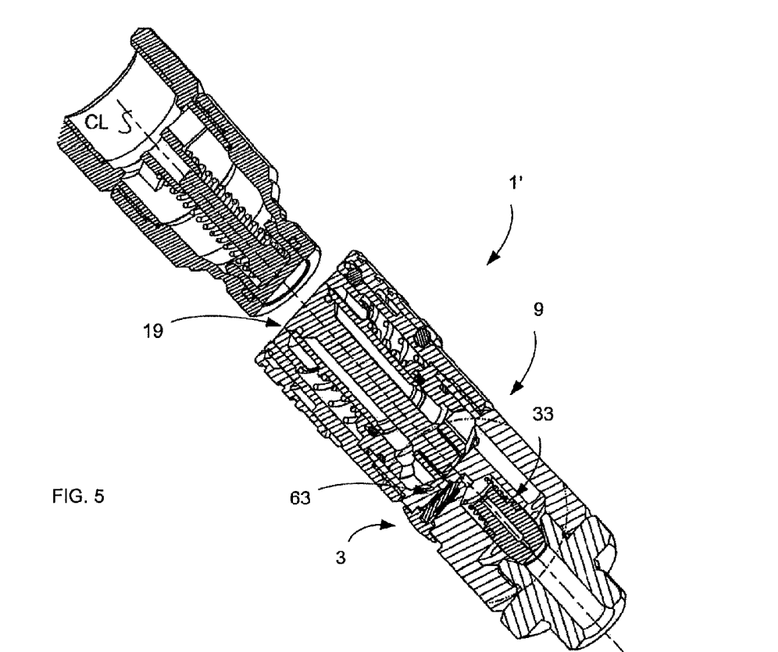
FIG. 5 shows a single coupling according to a fourth embodiment in which the female part has a pilot valve.

FIG. 5 shows a single coupling 1' according to a fourth embodiment in which the female part 9 has a pilot valve 63 and a push button 3. The pressure relief valve member 33 is also cylindrical in this embodiment. The main valve member 19 comprises a slide valve which, in contrast to the embodiment of FIG. 4a, does not have a main relief valve as the coupling 1' is used principally for air, which is of course more flexible than oil.

Figure 6:
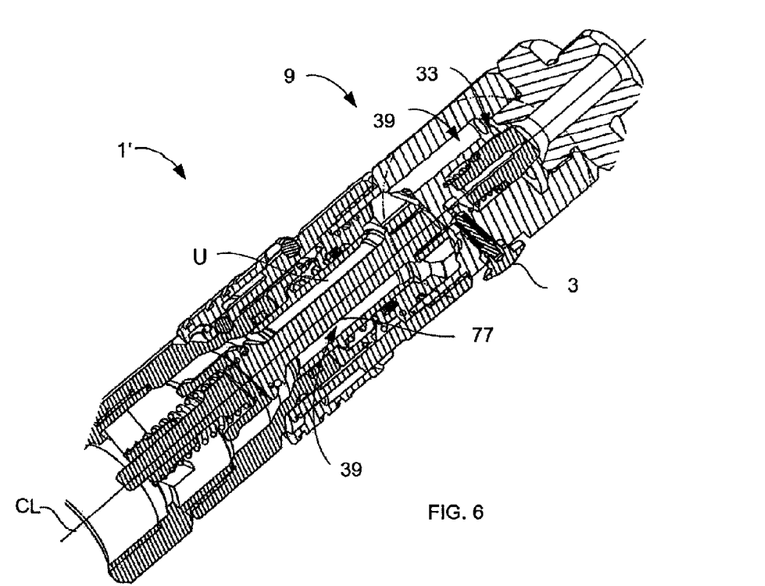
FIG. 6 shows the single coupling of FIG. 5 when the push button is released and fluid and can flow past and around the pressure relief valve member of the female part on to a central ducting system provided in the coupling.

FIG. 6 shows the single coupling 1' of FIG. 5 when the push button 3 is released and air can flow past the pressure relief valve member 33 of the female part 9, through the ducting system 39 and through a space U surrounding an actuator 77 provided on the female part 9.

Figure 7A:
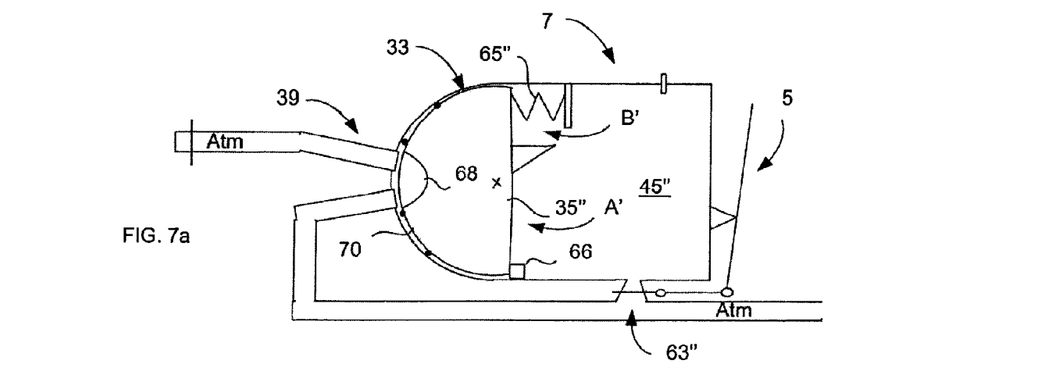
FIGS. 7a-7c show a fifth embodiment in which the pressure relief valve member of the female part is designed to pivot in a valve chamber.
Figure 7B:
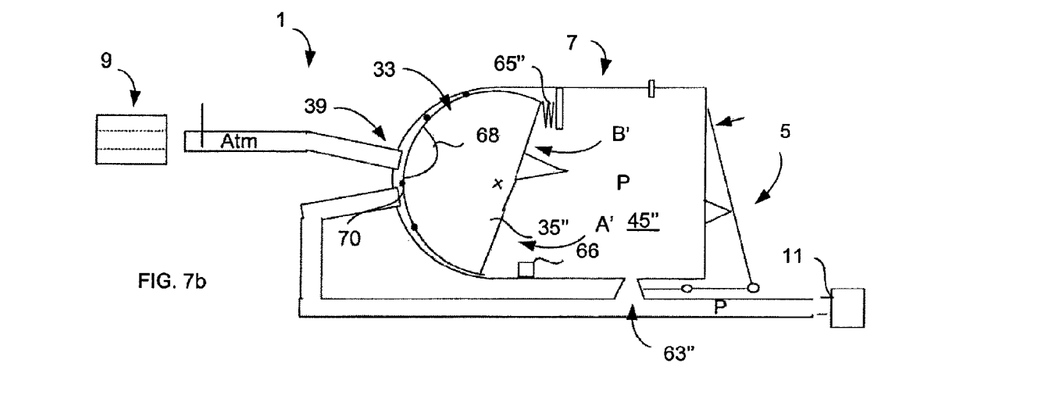
Figure 7C:
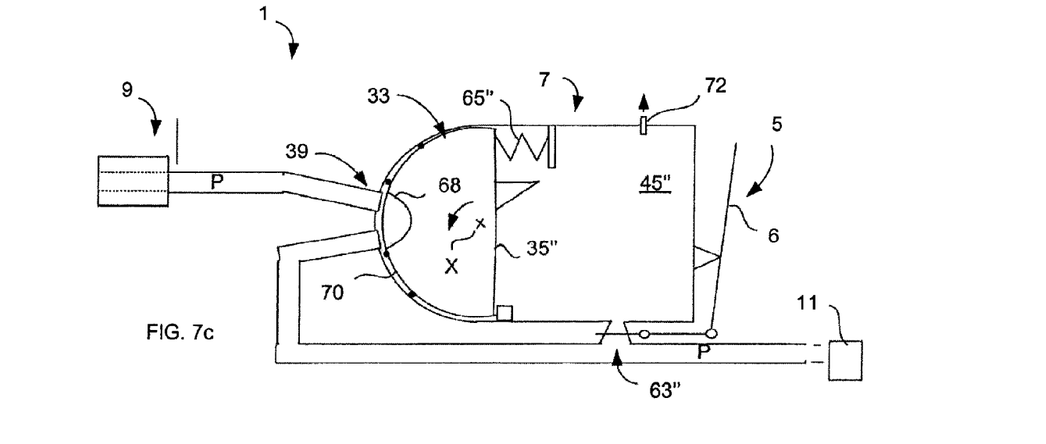

FIGS. 7a-7c show a fifth embodiment showing a pressure relief valve member 33 of the male part 7 comprising a movable valve body 35" designed to pivot in a valve chamber 45". An operating member 5 in the form of an operating arm is designed to tilt on the male part 7. The operating arm is coupled to a shunt valve 63" for closing or opening the supply of gas to and from the valve chamber 45". The valve body 35" comprises two surfaces A', B' directed towards a pressurising force of the gas, one surface A' being greater than the other surface B'. An elastic rubber element 65" presses with predetermined force against one edge of the valve body 35" so that the valve body 35" is in a stop position against a boss 66. In this position, a recess 68 on the side of the valve body 35" opposite the two surfaces A', B' is aligned with the ducting system 39 in order to achieve an open position. In FIG. 7b, a pressure source 11 is coupled in and a gas pressure P is produced. When the female part 9 is to be coupled into the male part 7 comprising the pilot valve (shunt valve 63") and the pressure relief valve member 33 (pressure chamber 45", valve body 35", recess 68, shoulder 70, etc.), a user tilts the operating arm in towards the side of the male part 7, as a result of which the pilot valve (shunt valve 63") opens and the pressure in the pressure chamber 45" corresponds to the pressure P. When the pressure P is applied to the two surfaces A', B', the surface with the greater area (in this case A') ensures that the valve body 35" pivots around its pivot axis X and the shoulder 70 closes against the ducting system 39 in a sealing manner. At this moment, or immediately thereafter, the user can couple the male part 7 into the female part 9 without using great force. Then, according to FIG. 7c, the user releases the operating arm 6 and the pilot valve (shunt valve 63") springs back and assumes its closed or throttled position. A bleeder valve 72 balances the gas pressure in the pressure chamber 45", the rubber element 65" presses the valve body 35" into its pivoted-back position and the recess 68 comes to rest in the region of the ducting system 39 and opens the latter so that the gas can be transmitted from the male part 7 to the female part 9.

Figure 8A:
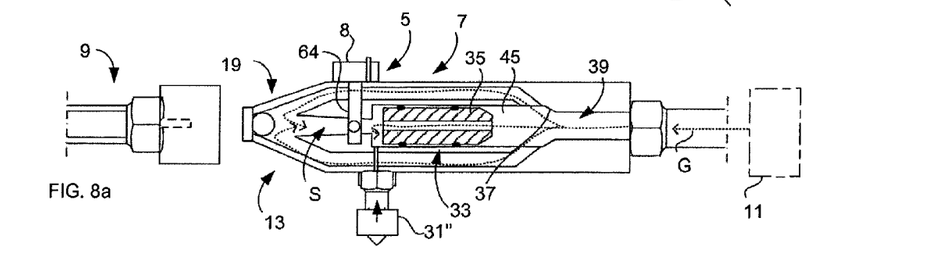
FIGS. 8a-8b show a sixth embodiment.
Figure 8B:
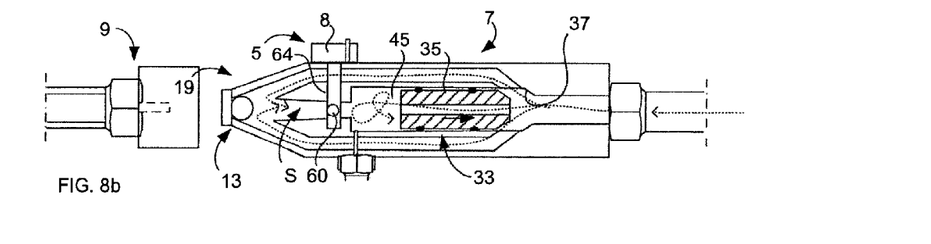
Figure 8C:
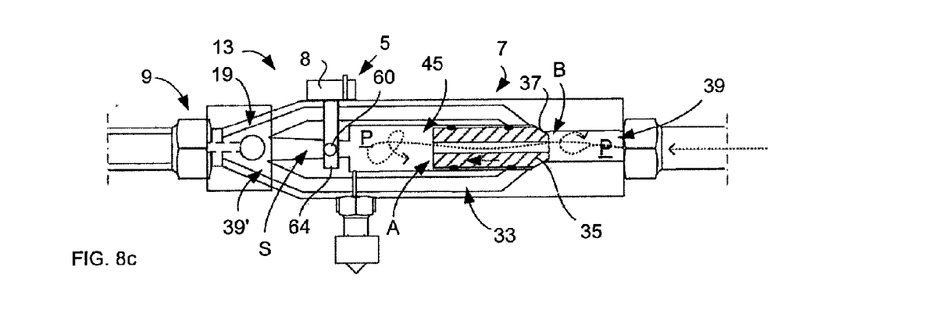
Figure 8D:
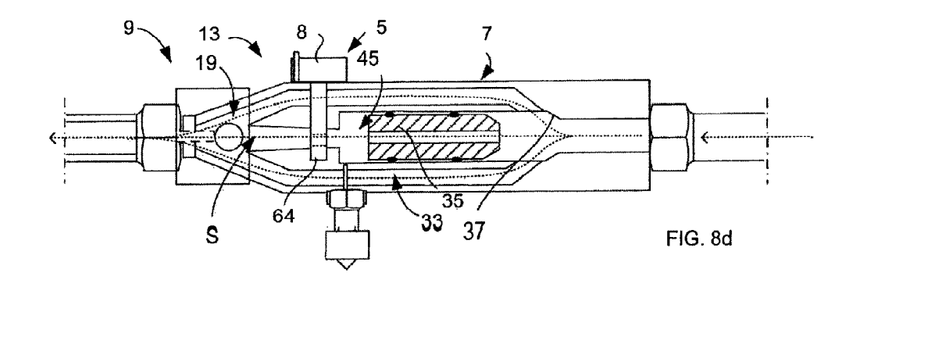

FIGS. 8a-8d show a sixth embodiment in which the figures show a male part 7 comprising a pressure relief valve member 33. A front portion 13 of the male part 7 comprises a main valve member 19 in the form of a ball valve. According to this embodiment, the resilient mechanism is formed by an external compressed air source 31" that can be turned on and shut off. The compressed air source 31" is coupled via a conduit to the valve chamber 45. The operating member 5 is designed as a handle 8 connected to a valve 64 comprising a transverse bore 60 adapted to come to rest in the region of a through control duct S. FIG. 8a shows that the male part 7 is pressurised with gas G. The handle 8 is turned into a closed position. The compressed air source 31"

is turned on and the valve body 35 begins to move towards the valve seat 37. The gas pressure built up also helps to move the valve body 35 in the direction of the valve seat 37 in closing the handle 8. In FIG. 8*b*, the user has shut off the external compressed air source (not shown) and the gas pressure in the valve chamber 45 drives the valve body 35 further. FIG. 8*c* shows how 35 seals completely against 37, the same pressure P prevailing on both sides of the valve body 35. A greater pressure surface A directed towards the valve chamber 45 than the opposing pressure surface B creates a force that presses the valve body 35 against the gas pressure in the ducting system 39. The rest of the ducting system 39' downstream of the valve seat 37 in the male part 7 thus becomes less pressurised when the valve body 35 seals against the valve seat 37 and the female part 9 can be coupled to the male part 7 and the ball valve opens, as shown in diagrammatic form in FIG. 8*c*. In FIG. 8*d*, the handle 8 is turned back into the open position and the gas can flow through the valve chamber 45 (as the bore 60 is aligned with and opens the control duct S, gas G flows towards the female part 9, which is not yet pressurised), as a result of which negative pressure is created behind the greater pressure surface A moving the valve body 35 away from the valve seat 37 again. When the valve body 35 opens, gas can then flow through the ducting system 39 adjacent to the pressure relief valve member 33 and on to the female part 9 and the valve body 35 is "sucked" in the direction of the gas flow.

This results in a coupling that can be coupled in a simple manner even when the male part is subjected to high pressure. Even in the case of low pressure and if the user has limited strength in his fingers, coupling can be facilitated by the operation of the handle and thus the pilot valve member.

The invention is not to be limited to the embodiments described hereinabove and other embodiments also describing the inventive concept are also possible within the scope of the invention or combinations of the embodiments described can be taken together to form one embodiment. Other examples of the invention are of course also conceivable, following from the accompanying claims. E.g. the material selected may be plastic, metal or other materials from outside the field of application. The ducting system may of course comprise only one duct traversing the coupling part. Different types of main valve member are conceivable, such as slide valve, ball valve, shunt valve, etc. The pilot valve may be formed by various types of control valves. The ducting system may be designed in various ways and may have various arrangements, it does not have to be arranged symmetrically around a centre line, but may be formed by a large duct disposed asymmetrically in the coupling part. It need not be only one coupling part that is pressurised during coupling of the coupling and examples are also conceivable in which both coupling parts (male part and female part) are pressurised and in which there are two operating members. One for each coupling part. Each coupling part then comprises a pilot valve member for controlling the flow of fluid to and for pressurising a valve chamber in the respective coupling parts in which respective pressure relief valve members are designed to move into a position in which the ducting system is opened or throttled. Fluid is defined in this application as a medium in the form of gas, air, water, oil, etc. Selected aluminium components of the coupling may be subjected to surface treatment. Anodising the surface of components of this kind results in high wear resistance. In addition, treating the surface with PTFE (polytetrafluorethylene) results in a surface with low friction, thereby further simplifying handling. The definition of the expression "throttling position" also includes the meanings "fully closed" or "partly closed, allowing for a slight outflow".

The invention claimed is:

1. A coupling comprising a male part and a female part (7, 9), each having a ducting system (39) for transmission of fluid (F, G) during use of the coupling (1, 1', 2), the male part or the female part comprising at least a front portion (13) comprising a main valve member (19) to prevent the fluid (F) from leaving the ducting system (39) when the coupling (1, 1', 2) is uncoupled, wherein the same male part or female part that comprises the main valve member (19) further comprises an operating member (5) connected to a pilot valve member (41, 63, 63", 64) for controlling the flow of fluid (F, G) to and for pressurising a valve chamber (45, 45") in which a pressure relief valve member (33, 33', 35, 35") is moveable into a position in which the ducting system (39) is opened, or throttled, to relieve pressure on the main valve member (19).

2. The coupling according to claim 1, wherein the operating member is a sliding sleeve (55) situated on an outside of the male part or female part (7, 9).

3. The coupling according to claim 1, wherein the valve chamber (45) is delimited by a wall surface (A) of the pressure relief valve member (33), said wall surface (A) acting as a pressure surface for driving the pressure relief valve member (33).

4. The coupling according to claim 1, wherein the pressure relief valve member (33, 35) comprises a through duct (47) having a smaller diameter than a main diameter of the ducting system (39).

5. The coupling according to claim 1, wherein a resilient mechanism (31) is provided for the pressure relief valve member (33, 35) in order to initiate movement of the pressure relief valve member from an open position to a throttling or closing position.

6. The coupling according to claim 5, wherein the resilient mechanism comprises a helical spring (65).

7. The coupling according to claim 1, wherein the pressure relief valve member (33') is cylindrical.

8. The coupling according claim 1, wherein the pressure relief valve member (33, 35) has a passageway (47) with a smaller diameter than a passageway (53, 60, 67) of the pilot valve member (41, 63, 64).

9. The coupling according to claim 1, wherein the main valve member (19) comprises a bleeder valve (71) to bleed off excess pressure remaining in the ducting system (39) between the main valve member (19) and the pressure relief valve member (33).

10. The coupling according to claim 1, wherein the main valve member (19) comprises a slide valve.

11. The coupling according to claim 1, wherein the fluid (F) comprises gas, water, oil and/or air.

12. The coupling according claim 1, wherein the operating member (5) comprises a push button (3).

13. The coupling according to claim 1, wherein the ducting system (39) comprises a plurality of parallel ducts (39, 39', 39") arranged circumferentially at a distance from and parallel to the valve chamber (45) of the pressure relief valve member (33).

14. The coupling according to claim 1, wherein the coupling is a single coupling (1').

15. The coupling according to claim 1, wherein the coupling is a coaxial coupling (2) for life-saving equipment (R).

16. A coupling comprising a male part and a female part (7, 9), each having a ducting system (39) for transmission of fluid (F, G) during use of the coupling (1, 1', 2), at least a front portion (13) comprising a main valve member (19) to prevent the fluid (F) from leaving the ducting system (39) when the coupling (1, 1', 2) is uncoupled, wherein an operating member (5) connected to a pilot valve member (41, 63, 63", 64) for controlling the flow of fluid (F, G) to and for pressurising a valve chamber (45, 45") in which a pressure relief valve member (33, 33', 35, 35") is moveable into a position in which the ducting system (39) is opened, or throttled, to relieve pressure on the main valve member (19), wherein the operating member is a sliding sleeve (55) situated on an outside of the male part or female part (7, 9).

17. A coupling comprising a male part and a female part (7, 9), each having a ducting system (39) for transmission of fluid (F, G) during use of the coupling (1, 1', 2), at least a front portion (13) comprising a main valve member (19) to prevent the fluid (F) from leaving the ducting system (39) when the coupling (1, 1', 2) is uncoupled, wherein an operating member (5) connected to a pilot valve member (41, 63, 63", 64) for controlling the flow of fluid (F, G) to and for pressurising a valve chamber (45, 45") in which a pressure relief valve member (33, 33', 35, 35") is moveable into a position in which the ducting system (39) is opened, or throttled, to relieve pressure on the main valve member (19), wherein the pressure relief valve member (33, 35) has a passageway (47) with a smaller diameter than a passageway (53, 60, 67) of the pilot valve member (41, 63, 64).

* * * * *